United States Patent
Nakashima et al.

(10) Patent No.: US 6,576,691 B2
(45) Date of Patent: Jun. 10, 2003

(54) FLAME RESISTANT POLYMER COMPOSITION

(75) Inventors: Hiroki Nakashima, Tokyo (JP); Kazuhisa Kodama, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/517,078

(22) Filed: Mar. 1, 2000

(65) Prior Publication Data

US 2002/0161093 A1 Oct. 31, 2002

(51) Int. Cl.[7] ............................. C08K 5/34; C08K 3/10
(52) U.S. Cl. ..................... 524/101; 524/212; 524/405; 524/436; 524/437
(58) Field of Search .................. 524/436, 437, 524/101, 212, 405

(56) References Cited

U.S. PATENT DOCUMENTS

| | | | | |
|---|---|---|---|---|
| 4,622,350 A | | 11/1986 | Icenogle et al. ............ | 523/200 |
| 4,622,352 A | * | 11/1986 | Djiauw et al. .............. | 524/437 |
| 4,859,366 A | * | 8/1989 | Djiauw et al. .............. | 524/436 |
| 5,191,024 A | * | 3/1993 | Shibata et al. ............. | 525/314 |
| 5,306,779 A | * | 4/1994 | Shibata et al. ............. | 525/314 |
| 5,346,964 A | * | 9/1994 | Shibata et al. ............. | 525/314 |
| 5,418,272 A | * | 5/1995 | Kawabata et al. .......... | 524/436 |

FOREIGN PATENT DOCUMENTS

| | | |
|---|---|---|
| EP | 0 249 010 | 12/1987 |
| EP | 0 370 518 | 5/1990 |
| EP | 0 398 758 | 11/1990 |
| EP | 0 546 841 | 6/1993 |

OTHER PUBLICATIONS

Patent Abstract of Japan, JP 10–279736, Oct. 20, 1998.
Patent Abstract of Japan, JP 05–271325, Oct. 19, 1993.
Patent Abstract of Japan, JP 05–271327, Oct. 19, 1993.
Derwent Publications, AN 1993–252883, JP 05 170968, Jul. 9, 1993.

* cited by examiner

*Primary Examiner*—Margaret Medley
(74) *Attorney, Agent, or Firm*—Oblon, Spivak, McClelland, Maier & Neustadt, P.C.

(57) ABSTRACT

A flame resistant polymer composition comprising: (A) 100 parts by weight of a mixture which comprises 1–99 wt % of (a-1) an olefin polymer and 1–99 wt % of (a-2) a hydrogenated conjugated diene polymer in which 80% or more of double bonds of the conjugated diene are saturated or (a-3) a random copolymer of ethylene and α-olefin having 3–10 carbon atoms, or both (a-2) and (a-3); and (B) 5 parts by weight or more of an inorganic flame retardant. The composition has excellent flame resistance, is free from production of toxic gas and environmental pollutant substances, and exhibits superior well-balanced characteristics such as molding processability, tensile strength, pliability (anti-whitening on bending), flexing resistance, and flexibility. The composition is useful as an electric wire coating material for interconnect wiring in equipment or harnesses for vehicles, and as industrial materials for insulating tapes.

17 Claims, No Drawings

FLAME RESISTANT POLYMER COMPOSITION

BACKGROUND OF THE INVENTION

1. Field of the Invention

The present invention relates to a flame resistance polymer composition. More particularly, the present invention relates to a flame resistant polymer composition having excellent flame resistance; free from production of toxic gas such as halogen gas and the like when burnt; free from environmental pollutant substances such as phosphorus, lead, and the like; exhibiting superior well-balanced characteristics such as molding processability, tensile strength, pliability (anti-whitening on folding), flexing resistance, flexibility, and the like; and useful for variety of applications such as electric wire coating materials for interconnect wiring in equipment or harnesses for vehicles, industrial materials for insulating tapes, and the like.

2. Description of the Background Art

Owing to excellent physical and chemical properties, polyolefin-based polymers (resins) are fabricated into films, sheets, pipes, containers, electric wires, cables and the like by means of various methods such as extrusion molding, injection molding, and the like, and are used as household utensils and industrial materials. Because these polyolefin resins are easily flammable, various methods for making the resins flame resistant have been disclosed. In a most common method known in the art, a halogen-containing organic flame retardant is used together with polyolefin resins. Although the use of a small amount of such a flame retardant exhibits an excellent flame resistant effect, the flame retardant has a problem of generating corrosive and toxic gas when burnt.

More recently, a flame resistant propylene resin composition comprising no halogen-containing organic flame retardant has been disclosed (Japanese Patent Application Laid-open No. 263851/1990). However, because this composition contains a phosphorus flame retardant which exhibits hygroscopic properties, the composition requires a measure for preventing bleed-out. Although a certain effect of bleed-out prevention can be attained by the addition of an olefinic rubber and a silane coupling agent, the resulting composition is not necessarily satisfactory from the viewpoint of characteristics such as pliability, flexibility, and the like, as well as from the viewpoint of environmental harmonization.

Another example is a flame resistant polypropylene composition comprising propylene homopolymer, ethylene-propylene copolymer rubber, bis(2,3-dibromopropyl)ether of tetrabromobisphenol S, and antimony trioxide (Japanese Patent Application Laid-open No. 183337/1981). However, because bis(2,3-dibromopropyl)ether of tetrabromobisphenol S which is used in this composition as a flame retardant is a suspected environmental hormone, the composition is not necessarily satisfactory from the viewpoint of environmental harmonization. In addition, although the composition exhibits improved impact strength due to the use of an ethylene-propylene copolymer rubber, the flexibility which is required for wiring and fabrication when the composition is used as an electric wire coating material is not necessarily satisfactory.

Furthermore, a method of using a hydrated inorganic metal compound such as aluminum hydroxide or magnesium hydroxide as a non-pollutant and environmentally harmonious flame retardant has been disclosed (for instance, Japanese Patent Application Laid-open No. 279736/1998). However, a large amount of such a hydrated inorganic metal compound must be added to a flame resistance composition to ensure adequately high flame resistance. This not only results in decrease in the mechanical properties, particularly tensile strength, but also impairs molding processability.

The present invention has been achieved in view of this situation and has an objective of providing a flame resistant polymer composition having excellent flame resistance; free from production of toxic gas such as halogen gas and the like when burnt; free from environmental pollutant substances such as phosphorus, lead, and the like; exhibiting superior well-balanced characteristics such as molding processability, tensile strength, pliability (anti-whitening on folding), flexing resistance, flexibility, and the like; and useful for variety of applications such as electric wire coating materials for interconnect wiring in equipment or harnesses for vehicles, industrial materials for insulating tapes, and the like.

SUMMARY OF THE INVENTION

As a result of extensive studies, the present inventors have found that a flame resistant polymer composition generating no toxic gas when burnt, being free from environmentally pollutant substances, and satisfying all of the above characteristics can be obtained by a resin composition comprising (A) 100 parts by weight of a mixture which comprises a polyolefin-based polymer and a specific hydrogenated conjugated diene polymer and/or a random copolymer of ethylene and α-olefin having 3–10 carbon atoms, and (B) 5 parts by weight or more of an inorganic flame retardant. This finding has led to the completion of the present invention. Specifically, the following flame resistance polymer compositions are provided according to the present invention.

(1) A flame resistant polymer composition comprising:
(A) 100 parts by weight of a mixture which comprises 1–99 wt % of (a-1) an olefin polymer and 1–99 wt % of (a-2) a hydrogenated conjugated diene polymer in which 80% or more of double bonds of the conjugated diene are saturated or (a-3) a random copolymer of ethylene and α-olefin having 3–10 carbon atoms, or both (a-2) and (a-3); and (B) 5 parts by weight or more of an inorganic flame retardant.

(2) The flame resistant polymer composition described in (1) above, wherein the olefin polymer (a-1) is a mixture of a non-modified polyolefin and a modified polyolefin containing a functional group.

(3) The flame resistant polymer composition described in (2) above, wherein the content of the modified polyolefin in the mixture is 5–150 parts by weight for 100 parts by weight of the non-modified polyolefin.

(4) The flame resistant polymer composition described in (2) above, wherein the functional group in the modified polyolefin is at least one group selected from the group consisting of an acid anhydride group, carboxyl group, hydroxyl group, amino group, isocyanate group, and epoxy group.

(5) The flame resistant polymer composition described in (1) above, wherein the content of side chain vinyl bond of the conjugated diene portion before hydrogenation in the hydrogenated conjugated diene polymer (a-2) in component (A) is 55 wt % or more.

(6) The flame resistant polymer composition described in (1) above, wherein the random copolymer of ethylene and α-olefin having 3–10 carbon atoms (a-3) in component (A) is a random copolymer of ethylene and 1-butene or a random copolymer of ethylene and 1-octene, or both.

(7) The flame resistant polymer composition described in (1) above, wherein the inorganic flame retardant (B) comprises magnesium hydroxide or aluminum hydroxide, or both.

(8) The flame resistant polymer composition described in (2) above, wherein the surface of the inorganic flame retardant (B) is treated with a silane coupling agent.

(9) The flame resistant polymer composition described in (7) above, wherein the surface of the inorganic flame retardant (B) is treated with a silane coupling agent.

Other objects, features and advantages of the invention will hereinafter become more readily apparent from the following description.

DETAILED DESCRIPTION OF THE INVENTION AND PREFERRED EMBODIMENTS

The flame resistance polymer composition of the present invention will now be described in more detail by way of embodiments.

The flame resistant polymer composition of the present invention comprises (A) 100 parts by weight of a mixture which comprises 1–99 wt % of (a-1) a polyolefin-based polymer and 1–99 wt % of (a-2) a hydrogenated conjugated diene polymer in which 80% or more of double bonds of the conjugated diene are saturated or (a-3) a random copolymer of ethylene and α-olefin having 3–10 carbon atoms, or both (a-2) and (a-3) (hereinafter may be called "Mixture (A)"), and (B) 5 parts by weight or more of an inorganic flame retardant (hereinafter may be called "inorganic flame retardant (B)").

Each components for the composition will now be described in more detail.

1. Mixture (A)

The mixture (A) used in the present invention comprises 1–99 wt % of (a-1) a polyolefin-based polymer (hereinafter may be called "polyolefin-based polymer (a-1)") and 1–99 wt % of (a-2) a hydrogenated conjugated diene polymer in which 80% or more of double bonds of the conjugated diene portion are saturated (hereinafter may be called "hydrogenated conjugated diene polymer (a-2)") and/or (a-3) a random copolymer of ethylene and α-olefin having 3–10 carbon atoms (hereinafter may be called "ethylene and α-olefin random copolymer (a-3)").

(1) Polyolefin-based Polymer (a-1)

The polyolefin-based polymer (a-1) used in the present invention is a crystalline polyolefin resin (polymer) which can be obtained by the polymerization of one or more types of monoolefins by either the high pressure polymerization method or low pressure polymerization method. Particularly preferable polyolefin resins are polyethylene, polypropylene, and polybutene-1. The polyolefin resin may be either a homopolymer or a copolymer which is produced by the copolymerization of a main monomer and other monomers shown below.

Given as examples of copolymerizable monomers are linear α-olefins such as ethylene (excluding the case where the main polymer is polyethylene), propylene (excluding the case where the main polymer is polypropylene), butene-1 (excluding the case where the main polymer is polybutene-1), pentene-1, hexene-1, heptene-1, and octene-1; branched α-olefins such as 4-methyl pentene-1,2-methylpropene-1, 3-methylpentene-1,5-methylhexene-1,4-methylhexene-1, and 4,4-dimethylpentene-1; and other monomers copolymerizable with these α-olefins. The amount of these copolymerizable monomers is preferably 20 wt % or less, and more preferably 10 wt % or less. There is no specific limitations to the manner of copolymerization. Random polymerization, block polymerization, graft polymerization, or a mixed-type of these manners of polymerization may be acceptable.

Propylene-ethylene copolymer, propylene-butene-1 copolymer, butene-1-ethylene copolymer, propylene-ethylene-butene-1 copolymer, and the like can be given as preferable copolymers used as the polyolefin-based polymer (a-1). These polyolefin-based polymers may be used either individually or in combinations of two or more.

Either a non-modified polyolefin-based polymer or a modified polyolefin-based polymer which is modified with at least one functional group selected from the group consisting of an acid anhydride group, carboxyl group, hydroxyl group, amino group, isocyanate group, and epoxy group, or a mixture of the non-modified polyolefin-based polymer and modified polyolefin-based polymer can be used as the polyolefin-based polymer (a-1). When a mixture is used, a mixture containing 5–150 parts by weight of a modified polyolefin-based polymer for 100 parts by weight of a non-modified polyolefin-based polymer is preferable. If less than 5 parts by weight, the effect on improvement in the mechanical strength may be insufficient; if more than 150 parts by weight, tensile elongation may be impaired.

The amount of polyolefin-based polymer (a-1) added to the mixture (A) is 1–99 wt %, and preferably 20–80 wt %. If less than 1 wt %, the mechanical strength and heat resistance decreases; if more than 99 wt %, tensile elongation and flexibility is impaired.

(2) Hydrogenated Conjugated Diene Polymer (a-2)

Given as examples of hydrogenated conjugated diene polymer (a-2) used in the present invention are hydrogenated products of diene polymers such as a homopolymer of a conjugated diene, a random copolymer of a conjugated diene and an aromatic vinyl compound, a block copolymer which consists of polymer blocks of an aromatic vinyl compound and polymer blocks of a conjugated diene compound, a block copolymer which consists of polymer blocks of an aromatic vinyl compound and random copolymer blocks of a conjugated diene and an aromatic vinyl compound, a block copolymer which consists of polymer blocks of a conjugated diene compound and copolymer blocks of a conjugated diene and an aromatic vinyl compound, a block copolymer which consists of polymer blocks of a conjugated diene compound and a taper-shaped blocks consisting of an aromatic vinyl compound and a conjugated diene compound in which the aromatic vinyl compound gradually increases, a block copolymer which consists of random copolymer blocks of a conjugated diene and an aromatic vinyl compound and a taper-shaped blocks consisting of an aromatic vinyl compound and a conjugated diene compound in which the aromatic vinyl compound gradually increases, a block copolymer which consists of polybutadiene blocks containing 30 wt % or less side chain vinyl bonds and polymer blocks of a conjugated diene compound containing 30 wt % or more side chain vinyl bonds, and the like. The above polymers before hydrogenation may be hereinafter called "unhydrogenated polymers".

Although there is no limitations to the amount of side chain vinyl bonds in the hydrogenated conjugated diene polymer (a-2) before hydrogenation, which is the ratio of 1,2-vinyl bonds and 3,4-vinyl bonds in the conjugated diene portion of the unhydrogenated polymer, such an amount is preferably 55 wt % or more. If less than 55 wt %, the effect on improvement in the whitening on folding may be insufficient.

The hydrogenated conjugated diene polymer (a-2) may be modified by a functional group. Specifically, a diene polymer may be modified with at least one group selected from the group consisting of an acid anhydride group, carboxyl group, hydroxyl group, amino group, isocyanate group, and epoxy group.

The ratio of a conjugated diene compound and an aromatic vinyl compound which form the unhydrogenated polymer is preferably 95:5–40:60, and more preferably 93:7–50:50.

Given as examples of conjugated diene compounds used for the hydrogenated conjugated diene polymer (a-2) are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene, and the like. Among these, 1,3-butadiene, isoprene, and 1,3-pentadiene, particularly 1,3-butadiene and isoprene, are preferable to obtain hydrogenated conjugated diene polymers which are industrially usable and have excellent properties. As aromatic vinyl compounds, styrene, $\alpha$-methylstyrene, $\alpha$-methylstyrene, t-butylstyrene, divinylbenzene, N,N-dimethyl-p-aminoethylstyrene, N,N-diethyl-p-aminoethyl styrene, vinyl pyridine, and the like can be given. Among these, styrene and $\alpha$-methylstyrene are preferred.

The above unhydrogenated polymer may be a polymer of which the polymer molecular chain is extended or branched via a coupling residue by using a coupling agent.

Given as examples of coupling agents are diethyl adipic acid, divinylbenzene, methyldichlorosilane, silicon tetrachloride, butyltrichlosilicate, tetrachlorostannate, butyltrichlorostannate, dimethylchlorosilicate, tetrachlorogermanium, 1,2-dibromoethane, 1,4-chloromethylbenzene, bis(trichlorosilyl)ethane, epoxidated linseed oil, tolylenediisocyanate, 1,2,4-benzenetriisocyanate, and the like.

A hydrogenated product of two or more unhydrogenated polymers may also be used as a hydrogenated conjugated diene polymer (a-2). In addition, a blend of two or more hydrogenated conjugated diene polymers can also be used.

Such a hydrogenated conjugated diene polymer (a-2) is a hydrogenation product of a polymer of which the major polymerizable component is a conjugated diene compound, and 80% or more, preferably 90% or more double bonds in the conjugated diene portion has been saturated. If the proportion of the hydrogenation is less than 80%, weather resistance and the like are impaired.

A preferable number average molecular weight of the hydrogenated conjugated diene polymer (a-2) is in the range from 10,000 to 700,000, and more preferably from 50,000 to 600,000. If less than 10,000, the hydrogenated conjugated diene polymer is easily blocked when pelletized and the product obtained by blending with the polyolefin-based polymer (a-1) may have lowered mechanical strength. If more than 700,000, flowability, processability, and appearance of molded products may be inferior.

Such a hydrogenated conjugated diene polymer (a-2) can be obtained by the methods disclosed, for example, in Japanese Patent Application Laid-open No. 72512/1991 (page 4, upper right column, line 13 to page 6, lower left column, line 1), Japanese Patent Application Laid-open No. 271325/1993 (page 3, left column, line 42 to page 7, right column, line 19), and Japanese Patent Application Laid-open No. 271327/1993 (page 3, left column, line 36 to page 7, right column, line 31).

The amount of hydrogenated conjugated diene polymer (a-2) added to the mixture (A) is 1–99 wt %, and preferably 20–80 wt %. If less than 1 wt %, tensile elongation and flexibility will be impaired; and if more than 99 wt %, mechanical strength and heat resistance decrease. When use in combination with ethylene-$\alpha$-olefin random copolymer (a-3) which is hereinafter discussed, the total amount of the hydrogenated conjugated diene polymer (a-2) and ethylene-$\alpha$-olefin random copolymer (a-3) is 1–99 wt %, and preferably 20–80 wt %.

(3) Ethylene-$\alpha$-olefin Random Copolymer (a-3)

The ethylene-$\alpha$-olefin random copolymer (a-3) used in the present invention has an ethylene content preferably in the range of 35–85 wt %, and more preferably 40–85 wt %. If less than 35 wt %, tensile characteristics of the resultant flame resistance polymer composition may be lowered; if more than 85 wt %, flexing resistance may be impaired. In addition, the ethylene-$\alpha$-olefin random copolymer (a-3) has a melting point peak measured by a differential scanning calorimeter (DSC) of preferably 100° C. or less, and more preferably 95° C. or less. If higher than 100° C., the flexing resistance of the flame resistance polymer composition of the present invention may be impaired.

The $\alpha$-olefin component in the copolymer has carbon atom in the range from 3 to 10. The carbon atom number is more preferably from 4 to 10 to ensure excellent tensile strength and tensile elongation.

The ethylene-$\alpha$-olefin random copolymer (a-3) may be a modified ethylene-$\alpha$-olefin random copolymer which contain a functional group. At least one group selected from the group consisting of an acid anhydride group, carboxyl group, hydroxyl group, amino group, isocyanate group, and epoxy group can be used as such a functional group. The modified ethylene-$\alpha$-olefin random copolymer can be manufactured using the same method as used for manufacturing the modified polyolefin-based polymer.

Propylene, 1-butene, 1-pentene, 1-hexene, 1-heptene, 1-octene, 1-decene, 1-dodecene, 1-hexadodecene, 4-methyl-1-pentene, and the like can be given as $\alpha$-olefins which form the ethylene-$\alpha$-olefin random copolymer (a-3). Of these, 1-butene and 1-octene are preferable.

A random copolymer of ethylene and 1-butene and a random copolymer of ethylene and 1-octene can be given as preferable examples of the ethylene-$\alpha$-olefin random copolymer (a-3).

If required, the ethylene-$\alpha$-olefin random copolymer (a-3) may be a copolymer with other polymerizable monomers insofar as the characteristics of the flame resistance polymer composition of the present invention are not adversely affected.

The following compounds can be given as examples of such other polymerizable monomers: vinyl compounds such as styrene, vinyl cyclopentene, vinyl cyclohexane, and vinyl norbornene; vinyl esters such as vinyl acetate; unsaturated organic acids or their anhydrides such as (meth)acrylic acid and maleic anhydride; and non-conjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-methylene-2-norbornene, 5-isopropyldene-2-norbornene, 6-chloromethyl-5-iso-propenyl-2-norbornene, 2,3-diisopropyldene-5-norbornene, 2-ethylidene-3-isopropyldene-5-norbornene, 2-propenyl-2,2-norbornadiene, and the like.

The ethylene-$\alpha$-olefin random copolymer (a-3) may contain recurring units derived from such other polymerizable monomers in the amount of 10 mol % or less, preferably 5 mol % or less, and more preferably 3 mol % or less, of the total recurring units.

The ethylene-α-olefin random copolymer (a-3) may be a single ethylene-α-olefin random copolymer or may be a mixture of two or more ethylene-α-olefin random copolymers.

A melt flow rate (MRF) at a temperature of 230° C. and a load of 2.16 kg of the ethylene-α-olefin random copolymer (a-3) is preferably from 0.01 to 100 g/10 minutes, and more preferably from 0.05 to 50 g/10 minutes. If the MFR is more than 100 g/10 minutes, Mechanical strength of the resulting flame resistance polymer composition of the present invention may be impaired; if less than 0.05 g/10 minutes, flowability, processability, and appearance of molded products may be inferior.

The amount of the ethylene-α-olefin random copolymer (a-3) added to the mixture (A) is 1–99 wt %, and preferably 20–80 wt %. If less than 1 wt %, tensile elongation and flexibility will be impaired; and if more than 99 wt %, mechanical strength and heat resistance decrease. When used in combination with a hydrogenated conjugated diene polymer (a-2), the total amount of the hydrogenated conjugated diene polymer (a-2) and the ethylene-α-olefin random copolymer (a-3) in the mixture (A) is 1–99 wt %, and preferably 20–80 wt %.

2. Inorganic Flame Retardant (B)

Aluminum hydroxide, magnesium hydroxide, zirconium hydroxide, basic magnesium carbonate, dolomite, hydrotalcite, calcium hydroxide, barium hydroxide, hydrated tin oxidize, hydrated inorganic metal compound such as borax, red phosphorus, and the like can be given as examples of inorganic flame retardant (B). Among these, magnesium hydroxide, an aluminum hydroxide are desirable. These inorganic flame retardants (B) may be used either individually or in combination of two or more.

The surface of the inorganic flame retardant (B) used in the present invention may be treated with a fatty acid such as stearic acid, oleic acid, or palmitic acid, or a metal salt thereof; paraffin, wax, polyethylene wax, or a modified product thereof, an organometallic compound such as an organic borate or organic titanate; or a silane coupling agent. When the polyolefin-based polymer is a mixture of a non-modified polyolefin and a modified polyolefin containing a functional group, the use of an inorganic flame retardant (B) of which the surface is treated with a silane coupling agent is particularly preferred due to outstanding improvement in the tensile strength of the resulting composition.

As required, an ammonium polyphosphate-type flame retardant, a phosphate-type flame retardant, a silicone compound, quartz, and the like may be used to increase the flame resisting effect of the inorganic flame retardant (B). In addition, a flame retardant adjuvant such as water glass, frit, and the like, as well as silicon nitride staple fiber and the like which can prevent drip may be added.

The amount of inorganic flame retardant (B) used in the composition of the present invention is 5 parts by weight or more, preferably 25 parts by weight or more, and more preferably 50 parts by weight or more, for 100 parts by weight or the mixture (A). If less than 5 parts by weight, no composition exhibiting sufficient flame resistance can be obtained. Although there are no specific upper limits to the amount of inorganic flame retardant (B), 500 parts by weight can be given for example.

As required, the flame resistance polymer composition of the present invention may be cross-linked by a conventional method such as sulfur cross-linking, peroxide cross-linking, metal ion cross-linking, silane cross-linking, resin cross-linking, and the like.

3. Preparation of Flame Resistance Polymer Composition

Conventionally known methods can be used for preparing the flame resistance polymer composition of the present invention without any specific limitations. Examples of such methods include a method of melt-kneading mixtures using a known mixer such as an extruder, Banbury blender, kneading machine, roller, or any combinations of these, a method of dry-blending using an injection molding machine, and the like.

All components for the composition of the present invention may be mixed at one time, or a pre-mixture of any optional components may be prepared first, followed by the addition of remaining components.

The composition of the present invention may be fabricated into practically useful products by conventionally known methods such as extrusion molding, injection molding, two-color injection molding, sandwich molding, hollow mold, compression molding, vacuum forming, rotational molding, powder slash molding, vapor-foam molding, laminate molding, calender molding, blow molding, and the like. As required, the product may be processed by means of foaming, powdering, orientation, adhesion, printing, coating, plating, and the like.

Various optional additives may be added to the composition of the present invention as required. Included in such optional additives are stabilizers such as aging preventives, heat stabilizers, weather resistant agents, metal inactivators, UV absorbers, light stabilizers, and copper inhibitors; antiseptics and antifungal agents; dispersants; plasticizers; foaming agents; foaming adjuvants; coloring agents such as titanium oxide and carbon black; metal powders such as ferrite powder; glass fibers; inorganic fibers such as metal fibers; organic fibers such as carbon fibers and alamide fibers; inorganic whiskers such as composite fibers and potassium titanate whiskers; inorganic fillers such as glass beads, glass balloons, glass flakes, asbestos, mica, calcium carbonate, talc, silica, calcium silicate, hydrotalcite, kaolin, diatom earth, graphite, pumice, ebo powder, cotton flock, cork powder, barium sulfate, fluororesin, polymer beads, and mixtures of these; organic fillers such as polyolefin wax, cellulosic powder, and rubber powder; and low molecular weight polymers.

EXAMPLES

The present invention will now be described in more detail by way of examples, which should not be construed as limiting the present invention.

In the examples, "part(s)" means "part(s) by weight" and "%" means "wt %" unless otherwise indicated. Various measuring methods used in the examples are as follows.

<The Content of Side Chain Vinyl Bond Such as 1,2-bond>

The Hampton method using IR analysis was employed for the measurement of the content of side chain vinyl bond such as 1,2-bond.

<Hydrogenation Degree>

The hydrogenation degree of conjugated diene was calculated from 100 MHz, $^1$H-NMR spectrum measured in tetrachlorethylene solvent.

<Number Average Molecular Weight of Hydrogenated Conjugated Diene Polymer>

The polystyrene reduced number average molecular weight (hereinafter may be called "molecular weight") of hydrogenated conjugated diene polymers was measured by gel permeation chromatography (GPC).

<Ethylene Component Content in Ethylene-α-olefin Random Copolymer>

The ethylene component content was measured using the IR analytical method.

<Flowability>

Melt flow rate (MFR) at a temperature of 230° C. and a load of 2.16 kg was measured in accordance with JIS K7210 and was used as the index for molding processability.

<Tensile Characteristics>

The tensile strength and elongation of samples were measured according to JIS K6301.

<Pliability (Anti-whitening on Folding)>

Strips with a thickness of 2 mm was folded 180° to observe external whiteness. The pliability was evaluated according to the following standard.

○: Almost no whiteness occurred.

Δ: Folded parts slightly became white.

X: Folded parts conspicuously became white.

<Flexing Resistance>

Strips with a thickness of 2 mm was folded 180° ten times to evaluate the flexing resistance according to the following standard.

○: No cracks occurred.

Δ: Slightly cracks were observed.

X: Cracks were produced.

<Oxygen Index (O.I.)>

The oxygen index was measured according to JIS K7201. The oxygen index is the minimum oxygen concentration (vol %) in a mixed gas of oxygen and nitrogen required for a material to be continuously burnt under prescribed conditions. The larger the oxygen index, more excellent is the flame resistance.

The following components were used in Examples and Comparative Examples.

1. Mixture (A)

(1) Polyolefin-based Polymer (a-1)

① Non-modified Polyolefin Polymer

P-1: Propylene-ethylene random copolymer ("MD772H" manufactured by Nippon Polyolefin Co., Ltd., MFR=30 g/10 minutes)

P-2: Propylene-ethylene block copolymer ("BC05B" manufactured by Nippon Polychem Co., Ltd., MFR=5 g/10 minutes)

P-3: Low density polyethylene ("LJ800" manufactured by Nippon Polychem Co., Ltd., MFR=18 g/10 minutes (at 190° C. and 2.16 kg)).

② Modified Polyolefin Polymer

Q-1: Polypropylene modified with an acid anhydride ("Yumex 1001" manufactured by Sanyo Chemical Industries, Ltd. industry.)

Q-2: Polypropylene modified with hydroxide ("Yumex 1210" manufactured by Sanyo Chemical Industries, Ltd. industry.)

(2) Hydrogenated Conjugated Diene Polymer (a-2)

Hydrogenated conjugated diene polymers (s-1 to S-9) with the structure shown in Tables 1–2.

(3) Ethylene-α-olefin Random Copolymer (a-3)

EP: Ethylene-propylene random copolymer ("EP961SP" manufactured JSR Corp., MFR=0.8 g/10 minutes (at 230° C. and 2.16 kg), ethylene content: 77 wt %, melting point: 41° C.)

EB: Ethylene-1-butene random copolymer ("EBM2021P" manufactured JSR Corp., MFR=1.3 g/10 minutes (at 190° C. and 2.16 kg), ethylene content: 80 wt %, melting point: 69° C.)

EO: Ethylene-1-octene random copolymer ("ENGAGE8003" manufactured Dow-Chemical Co., MFR=1 g/10 minutes (at 190° C. and 2.16 kg), ethylene content: 82 wt %, melting point: 86° C.).

M-EP: Ethylene-propylene random copolymer modified with maleic anhydride ("EPT7741P" manufactured JSR Corp., MFR=0.8 g/10 minutes (at 230° C. and 2.16 kg), ethylene content: 77 wt %, melting point: 41° C.).

2. Inorganic Flame Retardant (B)

X-1: Magnesium hydroxide with the surface treated with higher fatty acid ("KISUMA 5A" manufactured by Kyowa Chemical Industry Co., Ltd.)

X-2: Magnesium hydroxide with the surface treated with a silane coupling agent ("KISUMA 5NH" manufactured by Kyowa Chemical Industry Co., Ltd.)

3. Silicone Compound

Y-1: "DC4–7105", manufactured by Toray-Dow Corning Silicone Co.

TABLE 1

| Polymers | S-1 | S-2 | S-3 | S-4 | S-5 |
|---|---|---|---|---|---|
| Structure of unhydrogenated polymer | | | | | |
| Conjugated diene compound | BD*1 | BD | BD | IP*3 | BD |
| Aromatic vinyl compound | ST*2 | ST | ST | ST | ST |
| Conjugated diene/Aromatic vinyl compound | 90/10 | 66/34 | 70/30 | 80/20 | 90/10 |
| The total aromatic vinyl compound bond content in A*4 and C*5 portions | 7 | 15 | 15 | 18 | 7 |
| Aromatic vinyl compound bonds in A portion | 7 | 15 | 5 | 18 | 7 |
| Vinyl compound bonds in B portion | 80 | 75 | 85 | 60 | 50 |
| Polymer structure before hydrogenation | A-B-A | A-B | A-B-C | A-B-A | A-B-A |
| Side chain vinyl bond content in conjugated diene portion in non-hydrogenated polymer | 80 | 75 | 80 | 60 | 50 |
| Average molecular weight ($\times 10^4$) | 25 | 40 | 20 | 20 | 20 |
| Rate of hydrogenation degree (%) | 98 | 99 | 98 | 98 | 98 |

*1BD: Butadine
*2ST: Styrene
*3IP: Isoprene
*4A Portion: Polymer portion made from aromatic vinyl compound as major components
*5C portion: Tapered polymer portion consisting of aromatic vinyl compound and conjugated diene compound.

TABLE 2

| Polymer | S-6 | S-7 | S-8 | S-9 |
|---|---|---|---|---|
| Structure of non-hydrogenated polymer | | | | |

TABLE 2-continued

| Polymer | S-6 | S-7 | S-8 | S-9 |
|---|---|---|---|---|
| Content of block (D) | 16 | 7 | | |
| Monomer for block (D) | ST | ST | | |
| Content of block (E) | 66 | 58 | 70 | 70 |
| Monomer for block (E) | BD | BD/ST | BD | BD |
| Vinyl bond content in block (E) | 78 | 40 | 81 | 40 |
| Conjugated diene/aromatic vinyl compound in block (E) | 100/0 | 75/25 | 100/0 | 100/0 |
| Content of block (F) | 17 | 35 | 30 | 30 |
| Monomer for block (F) | BD | BD | BD | BD |
| Vinyl bond content in block (F) | 17 | 16 | 11 | 11 |
| Structure of non-hydrogenated polymer | D-E-F | D-E-F | F-E-F | F-E-F |
| Content of side chain vinyl bond | 66 | 29 | 60 | 31 |
| Average molecular weight (×10$^4$) | 16 | 14 | 24 | 24 |
| Rate of hydrogenation degree (%) | 98 | 99 | 98 | 98 |

Examples 1–27 and Comparative Examples 1–3

Mixtures (A) of the polyolefin-based polymer (a-1), hydrogenated conjugated diene polymer (a-2), and inorganic flame retardant (B) shown in Tables 3–7 were blended and pelletized using a single axis extruder at 220° C. Test specimens were prepared from the pellets by injection molding. The property evaluation results are shown in Tables 3–7. It can be seen from the results shown in Tables 3–7 that the resin compositions of the present invention in Examples 1–27 showed well balanced tensile strength, tensile elongation, flame resistance, flexibility, pliability (anti-whitening on folding), and flexing resistance as compared with the resin compositions of Comparative Examples 1–3 which are shown in Table 8. The resin compositions in Examples 15 and 16 shown in Table 5, and Examples 23 and 27 shown in Table 7 use EP, EO, or M-EP as rubbery polymers, together with hydrogenated conjugated diene polymers. All these compositions have been proven to exhibit well balanced tensile strength, tensile elongation, flame resistance, pliability (anti-whitening on folding), and flexing resistance.

In contrast, the resin compositions of Comparative Examples 1–3 exhibited only poorly balanced tensile strength, tensile elongation, flame resistance, flexibility, pliability (anti-whitening on folding), and flexing resistance.

TABLE 3

| Example | 1 | 2 | 3 | 4 | 5 | 6 |
|---|---|---|---|---|---|---|
| Non-modified polyolefin polymer | | | | | | |
| (Type) | P-1 | P-1 | P-2 | P-1 | P-1 | P-1 |
| (Part) | 50 | 50 | 50 | 50 | 50 | 50 |
| Hydrogenated conjugated diene polymer | | | | | | |
| (Type) | S-1 | S-2 | S-3 | S-4 | S-5 | S-6 |
| (Part) | 50 | 50 | 50 | 50 | 50 | 50 |
| Inorganic flame retardant (X-1) | | | | | | |
| (Part) | 150 | 150 | 150 | 150 | 150 | 150 |
| Properties | | | | | | |
| MFR (g/10 min) | 19 | 11 | 22 | 16 | 18 | 9 |
| Tensile strength (kgf/cm$^2$) | 88 | 82 | 101 | 143 | 80 | 85 |
| Tensile elongation (%) | 750 | 840 | 920 | 650 | 780 | 450 |
| Anti-whitening on folding | ○ | ○ | ○ | ○ | Δ | ○ |
| Flexing resistance | ○ | ○ | ○ | ○ | ○ | ○ |

TABLE 3-continued

| Example | 1 | 2 | 3 | 4 | 5 | 6 |
|---|---|---|---|---|---|---|
| Oxygen index (%) | 29 | 28 | 29 | 30 | 29 | 30 |

TABLE 4

| Example | 7 | 8 | 9 | 10 | 11 | 12 |
|---|---|---|---|---|---|---|
| Non-modified polyolefin polymer | | | | | | |
| (Type) | P-1 | P-1 | P-1 | P-1 | P-1 | P-1 |
| (Part) | 50 | 50 | 50 | 50 | 50 | 85 |
| Hydrogenated conjugated diene polymer | | | | | | |
| (Type) | S-7 | S-8 | S-9 | S-1 | S-1 | S-1 |
| (Part) | 50 | 50 | 50 | 50 | 50 | 15 |
| Inorganic flame retardant (X-1) | | | | | | |
| (Part) | 150 | 150 | 150 | 25 | 300 | 150 |
| Properties | | | | | | |
| MFR (g/10 min) | 14 | 12 | 9 | 17 | 25 | 23 |
| Tensile strength (kgf/cm$^2$) | 156 | 90 | 167 | 172 | 55 | 143 |
| Tensile elongation (%) | 550 | 630 | 520 | 900 | 530 | 620 |
| Anti-whitening on folding | Δ | ○ | Δ | ○ | ○ | ○ |
| Flexing resistance | ○ | ○ | ○ | ○ | ○ | ○ |
| Oxygen index (%) | 29 | 29 | 29 | 20 | 35 | 29 |

TABLE 5

| Examples | 13 | 14 | 15 | 16 | 17 |
|---|---|---|---|---|---|
| Non-modified polyolefin polymer | | | | | |
| (Type) | P-1 | P-3 | P-1 | P-1 | P-1 |
| (Part) | 15 | 50 | 40 | 40 | 50 |
| Hydrogenated conjugated diene polymer | | | | | |
| (Type) | S-1 | S-1 | S-1 | S-1 | S-1 |
| (Part) | 85 | 50 | 50 | 50 | 50 |
| Inorganic flame retardant (X-1) | | | | | |
| (Part) | 150 | 150 | 150 | 150 | 140 |
| Silicone compound (Y-1) | | | | | |
| (Part) | | | | | 5 |
| Rubbery polymer | | | | | |
| (Type) | | | EP | EO | |
| (Part) | | | 10 | 10 | |
| Properties | | | | | |
| MFR (g/10 min) | 16 | 11 | 17 | 18 | 20 |
| Tensile strength (kgf/cm$^2$) | 79 | 81 | 82 | 83 | 95 |
| Tensile elongation (%) | 880 | 550 | 690 | 720 | 810 |
| Anti-whitening on folding | ○ | ○ | ○ | ○ | ○ |
| Flexing resistance | ○ | ○ | ○ | ○ | ○ |
| Oxygen index (%) | 29 | 30 | 29 | 30 | 29 |

TABLE 6

| Examples | 18 | 19 | 20 | 21 | 22 |
|---|---|---|---|---|---|
| Non-modified polyolefin polymer | | | | | |
| (Type) | P-1 | P-1 | P-1 | P-1 | P-1 |
| (Part) | 50 | 50 | 40 | 40 | 40 |
| Modified polyolefin polymer | | | | | |

TABLE 6-continued

| Examples | 18 | 19 | 20 | 21 | 22 |
|---|---|---|---|---|---|
| (Type) | | | Q-1 | Q-1 | Q-2 |
| (Part) | | | 10 | 10 | 10 |
| Hydrogenated conjugated diene polymer | | | | | |
| (Type) | S-1 | S-1 | S-1 | S-1 | S-1 |
| (Part) | 50 | 50 | 50 | 50 | 50 |
| Inorganic flame retardant (X-1) | | | | | |
| (Part) | | 75 | 150 | | |
| Inorganic flame retardant (X-2) | | | | | |
| (Part) | 150 | 75 | | 150 | 150 |
| Properties | | | | | |
| MFR (g/10 min) | 13 | 16 | 18 | 12 | 13 |
| Tensile strength (kgf/cm²) | 93 | 90 | 98 | 160 | 120 |
| Tensile elongation (%) | 680 | 710 | 640 | 320 | 550 |
| Anti-whitening on folding | ○ | ○ | ○ | ○ | ○ |
| Flexing resistance | ○ | ○ | ○ | ○ | ○ |
| Oxygen index (%) | 29 | 29 | 29 | 29 | 29 |

TABLE 7

| Example | 23 | 24 | 25 | 26 | 27 |
|---|---|---|---|---|---|
| Non-modified polyolefin polymer | | | | | |
| (Type) | P-1 | P-1 | P-1 | P-1 | P-1 |
| (Part) | 40 | 40 | 15 | 75 | 40 |
| Modified polyolefin polymer | | | | | |
| (Type) | | Q-1 | Q-1 | Q-1 | Q-1 |
| (Part) | | 10 | 10 | 10 | 5 |
| Hydrogenated conjugated diene polymer | | | | | |
| (Type) | S-1 | S-8 | S-1 | S-1 | S-1 |
| (Part) | 50 | 50 | 75 | 15 | 50 |
| Inorganic flame retardant (X-2) | | | | | |
| (Part) | 150 | 150 | 150 | 150 | 150 |
| Rubbery polymer | M-EP | | | | M-EP |
| (Part) | 10 | | | | 5 |
| Properties | | | | | |
| MFR (g/10 min) | 12 | 9 | 10 | 17 | 12 |
| Tensile strength (kgf/cm²) | 140 | 165 | 143 | 185 | 151 |
| Tensile elongation (%) | 450 | 280 | 410 | 220 | 380 |
| Anti-whitening on folding | ○ | ○ | ○ | ○ | ○ |
| Flexing resistance | ○ | ○ | ○ | ○ | ○ |
| Oxygen index (%) | 29 | 29 | 29 | 29 | 29 |

TABLE 8

| Comparative Example | 1 | 2 | 3 |
|---|---|---|---|
| Non-modified polyolefin polymer | | | |
| (Type) | P-1 | | P-1 |
| (Part) | 100 | | 50 |
| Hydrogenated conjugated diene polymer | | | |
| (Type) | | S-1 | S-1 |
| (Part) | | 100 | 50 |
| Inorganic flame retardant (X-1) | | | |
| (Part) | 150 | 150 | 3 |
| Properties | | | |
| MFR (g/10 min) | 42 | 14 | 15 |
| Tensile strength (kgf/cm²) | 280 | 32 | 191 |
| Tensile elongation (%) | 10 | 820 | 930 |
| Anti-whitening on folding | x | ○ | ○ |
| Flexing resistance | x | ○ | ○ |
| Oxygen index (%) | 29 | 29 | 18 |

Examples 28–38 and Comparative Examples 4–6

Mixtures (A) of the polyolefin-based polymer (a-1), ethylene-α-olefin random copolymer (a-3), and inorganic flame retardant (B) shown in Tables 9–13 were blended and pelletized using a single axis extruder at 220° C. Test specimens were prepared from the pellets by injection molding. The property evaluation results are shown in Tables 9–13. The amounts of the components are shown by parts by weight in Tables 9–13.

The following remarks apply to the results of Examples 28–38 in Table 9–12.

The compositions of the present invention in Examples 28–38 have well balanced tensile strength, tensile elongation, flame retardant, and pliability as compared with the compositions of Comparative Examples 4–6 shown in Table 13.

The composition of Comparative Example 6 which does not contain an ethylene-α-olefin random copolymer (a-3) showed only a small tensile elongation, resulting in breakage due to a small deformation. The composition of Comparative Example 4 which does not contain a polyolefin-based polymer (a-1) showed only a poor tensile strength. The test specimen deformed significantly by a small stress.

TABLE 9

| | Example | | |
|---|---|---|---|
| | 28 | 29 | 30 |
| Non-modified polyolefin polymer | | | |
| (Type) | P-1 | P-1 | P-1 |
| (Part) | 50 | 50 | 50 |
| Ethylene-α-olefin copolymer | | | |
| (Type) | EP | EB | EO |
| (Part) | 50 | 50 | 50 |
| Inorganic flame retardant (X-1) | | | |
| (Part) | 150 | 150 | 150 |
| Properties | | | |
| MFR (g/10 min) | 17 | 19 | 18 |
| Tensile strength (kgf/cm²) | 80 | 126 | 113 |
| Tensile elongation (%) | 280 | 480 | 450 |
| Anti-whitening on folding | Δ | Δ | Δ |
| Flexing resistance | ○ | ○ | ○ |
| Oxygen index (%) | 29 | 29 | 29 |

TABLE 10

| | Example | | |
|---|---|---|---|
| | 31 | 32 | 33 |
| Non-modified polyolefin polymer | | | |
| (Type) | P-1 | P-1 | P-1 |

TABLE 10-continued

|  | Example | | |
|---|---|---|---|
|  | 31 | 32 | 33 |
| (Part)<br>Ethylene-α-olefin copolymer | 50 | 50 | 50 |
| (Type)<br>(Part)<br>Inorganic flame retardant (X-1) | EB<br>50 | EB<br>50 | EB<br>50 |
| (Part)<br>Inorganic flame retardant (X-2) | 25 | 300 |  |
| (Part)<br>Properties |  |  | 150 |
| MFR (g/10 min) | 17 | 25 | 13 |
| Tensile strength (kgf/cm²) | 141 | 72 | 130 |
| Tensile elongation (%) | 610 | 240 | 430 |
| Anti-whitening on folding | ○ | Δ | Δ |
| Flexing resistance | ○ | ○ | ○ |
| Oxygen index (%) | 20 | 35 | 29 |

TABLE 11

|  | Example | | |
|---|---|---|---|
|  | 34 | 35 | 36 |
| Non-modified polyolefin polymer |  |  |  |
| (Type)<br>(Part)<br>Modified polyolefin polymer | P-1<br>40 | P-1<br>40 | P-1<br>40 |
| (Type)<br>(Part)<br>Ethylene-α-olefin copolymer | Q-1<br>10 | Q-1<br>10 | Q-2<br>10 |
| (Type)<br>(Part)<br>Inorganic flame retardant (X-1) | EB<br>50 | EB<br>50 | EB<br>50 |
| (Part)<br>Inorganic flame retardant (X-2) | 150 |  |  |
| (Part)<br>Properties |  | 150 | 150 |
| MFR (g/10 min) | 18 | 13 | 13 |
| Tensile strength (kgf/cm²) | 136 | 192 | 143 |
| Tensile elongation (%) | 370 | 220 | 320 |
| Anti-whitening on folding | Δ | Δ | Δ |
| Flexing resistance | ○ | ○ | ○ |
| Oxygen index (%) | 29 | 29 | 29 |

TABLE 12

|  | Example | |
|---|---|---|
|  | 37 | 38 |
| Non-modified polyolefin polymer |  |  |
| (Type)<br>(Part)<br>Modified polyolefin polymer | P-1<br>50 | P-3<br>40 |
| (Type)<br>(Part)<br>Ethylene-α-olefin copolymer |  | Q-1<br>10 |
| (Type) | *6 | EB |

TABLE 12-continued

|  | Example | |
|---|---|---|
|  | 37 | 38 |
| (Part)<br>Inorganic flame retardant (X-2) | 50 | 50 |
| (Part)<br>Properties | 150 | 150 |
| MFR (g/10 min) | 11 | 14 |
| Tensile strength (kgf/cm²) | 142 | 170 |
| Tensile elongation (%) | 240 | 320 |
| Anti-whitening on folding | Δ | Δ |
| Flexing resistance | ○ | ○ |
| Oxygen index (%) | 29 | 29 |

*6 M-EP

TABLE 13

|  | Comparative Example | | |
|---|---|---|---|
|  | 4 | 5 | 6 |
| Non-modified polyolefin polymer |  |  |  |
| (Type)<br>(Part)<br>Ethylene-α-olefin copolymer |  | P-1<br>50 | P-3<br>100 |
| (Type)<br>(Part)<br>Inorganic flame retardant (X-1) | EP<br>100 | EB<br>50 |  |
| (Part)<br>Properties | 150 | 3 | 150 |
| MFR (g/10 min) | 14 | 16 | 45 |
| Tensile strength (kgf/cm²) | 18 | 148 | 265 |
| Tensile elongation (%) | 620 | 630 | 15 |
| Anti-whitening on folding | ○ | ○ | x |
| Flexing resistance | ○ | ○ | x |
| Oxygen index (%) | 29 | 18 | 30 |

As described above, a flame resistant polyolefin composition can be provided by the present invention. The composition has excellent flame resistance; is free from production of toxic gas such as halogen gas and the like when burnt; is free from environmental pollutant substances such as phosphorus, lead, and the like; exhibits superior well-balanced characteristics such as molding processability, tensile strength, pliability (anti-whitening on bending), flexing resistance, flexibility, and the like; and is useful for variety of applications such as electric wire coating materials for interconnect wiring in equipment or harnesses for vehicles, industrial materials for insulating tapes, and the like.

Obviously, numerous modifications and variations of the present invention are possible in light of the above teachings. It is therefore to be understood that, within the scope of the appended claims, the invention may be practiced otherwise than as specifically described herein.

What is claimed is:

1. A flame resistant polymer composition comprising:
   (A) 100 parts by weight of a mixture which comprises:
       1–99 wt % of (a-1) an olefin polymer;
       (a-2) a hydrogenated conjugated diene polymer; and
       (a-3) a random copolymer of ethylene and α-olefin having 3–10 carbon atoms;
       wherein the total amount of (a-2) and (a-3) is 1–99 wt%; and (B) 5 parts by weight or more of an inorganic flame retardant;

wherein the hydrogenated conjugated diene polymer is prepared by hydrogenating a conjugated diene polymer having a diene portion which has 60 wt % or more of side chain vinyl groups, so that 80% or more of the double bonds of the conjugated diene are saturated after hydrogenation.

2. The flame resistant polymer composition according to claim 1, wherein the olefin polymer (a-1) is a mixture of a non-modified polyolefin and a modified polyolefin containing a functional group.

3. The flame resistant polymer composition according to claim 2, wherein the content of the modified polyolefin in the mixture is 5–150 parts by weight for 100 parts by weight of the non-modified polyolefin.

4. The flame resistant polymer composition according to claim 2, wherein the functional group in the modified polyolefin is at least one group selected from the group consisting of an acid anhydride group, carboxyl group, hydroxyl group, amino group, isocyanate group, and epoxy group.

5. The flame resistant polymer composition of claim 1, further additives selected from the group consisting of heat stabilizers, weather resistant agents, metal inactivators, UV absorbers, light stabilizers, copper inhibitors, antiseptics, antifungal agents, dispersants, plasticizers, foaming agents, foaming adjuvants, coloring agents, metal powders, glass fibers, inorganic fibers, metal fibers, organic fibers, carbon fibers, aramide fibers, inorganic whiskers, inorganic fillers, polymer beads, organic fillers, and low molecular weight polymers.

6. The flame resistant polymer composition according to claim 1, wherein the random copolymer of ethylene and $\alpha$-olefin having 3–10 carbon atoms (a-3) in component (A) is a random copolymer of ethylene and 1-butene or a random copolymer of ethylene and 1-octene, or both.

7. The flame resistant polymer composition according to claim 1, wherein the inorganic flame retardant (B) comprises magnesium hydroxide or aluminum hydroxide, or both.

8. The flame resistant polymer composition according to claim 2, wherein the inorganic flame retardant (B) is an inorganic flame retardant which has been surface treated with a silane coupling agent.

9. The flame resistant polymer composition according to claim 7, wherein the inorganic flame retardant (B) is an inorganic flame retardant which has been surface treated with a silane coupling agent.

10. The flame resistant polymer composition of claim 1, wherein the inorganic flame retardant is selected from the group consisting of magnesium hydroxide, zirconium hydroxide, basic magnesium carbonate, dolomite, hydrotalcite, calcium hydroxide, barium hydroxide, hydrated tin oxide, borax, and red phosphorus.

11. The flame resistant polymer composition of claim 1, wherein olefin polymer (a-1) is selected from the group consisting of polyethylene, polypropylene, and polybutene-1.

12. The flame resistant polymer composition of claim 1, wherein olefin polymer (a-1) is a copolymer of ethylene and at least one monomer selected from the group consisting of propylene, butene-1, pentene-1, hexene-1, heptene-1, octene-1,4-methylpentene-1,2-methylpropene-1,3-methylpentene-1,5-methylhexene-1,4-methylhexene-1, and 4,4-dimethylpentene-1; a copolymer of propylene and at least one monomer selected from the group consisting of butene-1, pentene-1, hexene-1, heptene-1, octene-1,4-methylpentene-1,2-methylpropene-1,3-methylpentene-1,5-methylhexene-1,4-methylhexene-1, and 4,4-dimethylpenten-1; or butene-1 and at least one monomer selected from the group consisting of pentene-1, hexene-1, heptene-1, octene-1,4-methylpentene-1,2-methylpropene-1, 3-methylpentene-1,5-methylhexene-1,4-methylhexene-1, and 4,4-dimethylpenten-1.

13. The flame resistant polymer composition of claim 1, wherein olefin polymer (a-1) is selected from the group consisting of propylene-ethylene copolymer, butene-1-ethylene copolymer, and propylene-ethylene-butene-1 copolymer.

14. The flame resistant polymer composition of claim 1, wherein hydrogenated conjugated diene polymer (a-2) is a hydrogenated copolymer of a diene monomer selected form the group consisting of 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene with aromatic vinyl monomers selected from the group consisting of $\alpha$-methylstyrene, t-butylstyrene, divinylbenzene, N,N-dimethyl-p-aminoethylstyrene, N,N-diethyl-p-aminoethylstyrene, vinyl pyridene.

15. The flame resistant polymer composition of claim 1, wherein random copolymer (a-3) has an ethylene content of 35–85 wt %.

16. The flame resistant polymer composition of claim 1, wherein the $\alpha$-olefin is selected from the group consisting of propylene, 1-butene, 1-pentene, 1-hexene, 1-heptene, 1-octene, 1-decene, 1-dodecene, 1-hexadodecene, and 4-methyl-1-pentene.

17. The flame resistant polymer composition of claim 1, wherein the random copolymer (a-3) is modified with a functional group selected from the group consisting of acid anhydride group, carboxyl group, hydroxyl group, amino group, isocyanate group and epoxy group.

* * * * *

UNITED STATES PATENT AND TRADEMARK OFFICE
CERTIFICATE OF CORRECTION

PATENT NO. : 6,576,691 B2
DATED : June 10, 2003
INVENTOR(S) : Nakashima et al.

It is certified that error appears in the above-identified patent and that said Letters Patent is hereby corrected as shown below:

<u>Title page,</u>
The CPA information has been omitted.
Item [45], and the Notice information should read as follows:
-- [45] **Date of Patent: *Jun. 10, 2003**

[*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Item [30], Foreign Application Priority Data, has been omitted. Item [30] should read:
-- [30]      Foreign Application Priority Data
    Mar. 2, 1999  (JP) ………………….. 11-053452 --

Signed and Sealed this

Twenty-third Day of September, 2003

JAMES E. ROGAN
*Director of the United States Patent and Trademark Office*